UNITED STATES PATENT OFFICE.

ROBERT E. DIVINE, OF CINCINNATI, OHIO, ASSIGNOR TO THE TWITCHELL PROCESS COMPANY, OF CINCINNATI, OHIO, A CORPORATION OF OHIO.

PROCESS OF RECOVERING SULFONIC ACIDS FROM MINERAL-OIL SLUDGE.

1,330,624.      Specification of Letters Patent.      Patented Feb. 10, 1920.

No Drawing.      Application filed June 24, 1918. Serial No. 241,529.

*To all whom it may concern:*

Be it known that I, ROBERT E. DIVINE, a citizen of the United States, and residing at Cincinnati, in the county of Hamilton and State of Ohio, have invented a new and useful Process of Recovering Sulfonic Acids from Mineral-Oil Sludge, of which the following specification is a full disclosure.

My invention relates to a process for producing certain new and valuable products from mineral oil sulfonic sludge and to the resultant products. Sludges resulting from the sulfonation of mineral oils contain sulfonic acids having the valuable property of hydrolyzing fats and capable of being combined with other elements for the manufacture of detergent.

My invention relates further to a detail improvement on the process disclosed in my copending application, Serial No. 162,456, filed April 16, 1917.

The object of my invention is to form from mineral oil sludge certain water-soluble salts of sulfonic acid and of these calcium or barium water-soluble sulfonates.

A further object of the invention is to separate the sulfonic component of the sludge from the color components of the sludge, so as to produce substantially colorless mineral oil sulfonic products.

Another object of the invention is to produce a substantially colorless sulfonic body from the sulfonated mineral oil sludge, by water-extracting the sulfonic acids and other soluble sludge components, from the sludge mass, neutralizing the solution with an alkali earth, and salting out the sulfonate, free from sludge coloring matter.

Superior results have been obtained by treating a mineral oil distillate, such as illuminating oil, with $SO_3$ in gaseous form diluted with air and separating the resultant sludge. This sludge is heavy, viscous, semi-liquid body smelling strongly of $SO_2$ gas.

This particular sludge is desirable for my purpose because it contains about forty per cent. (40%) of sulfonic acid, some free sulfuric acid, coloring matter, unknown bodies, and only about ten per cent. (10%) of free oil which has to be removed. The sulfonic acid content of this sludge when separated, is very soluble in water, in fact, more readily soluble in water than in ether, and further characterized by the unique property of forming water-soluble combinations with earth metals, such as calcium. In these respects, the sulfonic acids obtainable from my process differ from the mineral oil sulfonic acids, with which I have been heretofore familiar.

I therefore take a sludge produced from sulfonating mineral oil, containing very water-soluble sulfonic acids, and dissolve one hundred parts of sludge into one hundred and fifty to two hundred parts of water, and allow it to stand for eight or twelve hours. Much heat is generated, sulfur-dioxid fumes are evolved, and the free oil will rise to the surface and is decanted. The under layer is a clear, dark-colored liquid, in which a rose purple color is discernible. To this liquid, I add sufficient lime to neutralize the solution and a portion of the lime combining with the free sulfuric acid is precipitated and filtered off from the solution of the calcium sulfonate, resulting from the combination of the lime with the sulfonic acid and the accompanying highly colored impurities.

This solution is a clear, red-wine color liquid, to which I add certain soluble salts up to about twenty per cent. (20%) of the weight of the solution, and the calcium sulfonate separates from or is "salted out" of the solution, which retains the coloring matter and which may be recovered by filtration and freed from the liquid by pressing.

I prefer, for this salting-out step, to use soluble calcium chlorid alone, or sodium chlorid and calcium chlorid. I preferably use a salt of the alkali earth metal selected for the neutralizing step, in order to concentrate that component in the solution. I use calcium-chlorid where lime is used for neutralizing, or barium chlorid if a barium salt is used for neutralizing. This effects a more complete salting out of the calcium sulfonate and prevents or lessens the formation of soluble sodium sulfonate, that is, the concentration of the calcium ion is increased by adding a soluble calcium salt. When calcium chlorid is used very much less sodium chlorid is required for completely salting out the sulfonates. It is easy to salt out the sulfonate from its water solution by means of a soluble calcium salt alone, the additional use of sodium chlorid being purely an economic consideration.

This body may be characterized as a water-soluble mineral oil calcium sulfonate, of light yellow color, plastic, sticky, of distinct aromatic odor, readily soluble in cold water, giving a neutral solution.

When the materials are used in substantially the proportions indicated, one hundred pounds of sludge yields approximately from fifty to sixty pounds of the calcium compound. The invention is not limited to the illustrating proportions stated, nor to the origin or method of producing the sludge, nor to the specific calcium combination. Calcium, barium, magnesium, aluminum, form water-soluble sulfonates, in like manner. An alkali-earth metal sulfonate of mineral oil sulfonic acid may be commercially used for saponifying purposes or for producing detergents, or it can be used as a base for the production of sulfonic acids. The calcium and magnesium sulfonates being freely soluble in water, detergents prepared from these sulfonic acids are perfectly adapted to usage in hard water without the disadvantages commonly attending the use of a soap.

Further, detergents made from these acids are eminently suited for use in salt water and will produce a copious lather in sea water.

Preferably, I employ a selected member of the alkali or earthy metal bases, functioning to neutralize the sulfonic acid solution, and having the property of forming sulfates relatively insoluble in water, and sulfonates readily soluble in water but capable of being salted out of the solution.

The alkali-earth metal sulfonates of this sludge sulfonic acid, are quite distinctive from the sulfonates formed by the Petroff process (Patent No. 1,087,888) in that they are readily soluble in water, and hence are available for a variety of commercial uses for which the Petroff sulfonates are unavailable, in addition to which the series of alkali-earth metals herein disclosed constitute a convenient sulfonic saponifying vehicle from which the sulfonic acids may be readily obtained for commercial purposes.

Having described my invention, I claim:—

1. The herein disclosed process of forming a substantially colorless alkali-earth sulfonate from sludge formed by sulfonating a portion of the contents of a mineral oil distillate, which consists in mixing the sludge with water, removing free oil, treating the solution with an alkali-earth to combine with the sulfonic acids, and salting the sulfonates from the solution with a soluble salt of the alkali-earth selected for the neutralizing step.

2. The herein disclosed process of forming a substantially colorless alkali-earth sulfonate from sludge formed by sulfonating a portion of the contents of a mineral oil distillate, which consists in mixing the sludge with water, removing free oil, treating the solution with an alkali-earth to combine with the sulfonic acids, and salting the sulfonates from the solution with sodium chlorid and a soluble salt of the alkali-earth selected for the neutralizing step.

In witness whereof I hereunto subscribe my name, as attested by the two subscribing witnesses.

ROBERT E. DIVINE.

Witnesses:
D. DRACHENBERG,
L. A. BECK.